United States Patent
Koyanagi

[11] Patent Number: 5,879,211
[45] Date of Patent: Mar. 9, 1999

[54] WATERCRAFT COMPONENT LAYOUT

[75] Inventor: Tomoyoshi Koyanagi, Iwata, Japan

[73] Assignee: Yamaha Hatsudoki Kabushiki Kaisha, Japan

[21] Appl. No.: 726,429

[22] Filed: Oct. 4, 1996

[30] Foreign Application Priority Data

Oct. 4, 1995 [JP] Japan .................................. 7-257441

[51] Int. Cl.⁶ .................................................. B63H 21/32
[52] U.S. Cl. ............................................. 440/89; 114/270
[58] Field of Search ........................... 440/38–42, 84–87; 114/270; 180/309, 190

[56] References Cited

U.S. PATENT DOCUMENTS

| | | | |
|---|---|---|---|
| 4,228,760 | 10/1980 | Kulischenko | 440/87 |
| 4,694,770 | 9/1987 | Kitner et al. | |
| 4,964,821 | 10/1990 | Tafoya | 440/41 |
| 5,212,949 | 5/1993 | Shiozawa | 440/89 |
| 5,366,401 | 11/1994 | Nanami et al. | 440/89 |
| 5,401,197 | 3/1995 | Kobayashi . | |
| 5,406,904 | 4/1995 | Kobayashi . | |

FOREIGN PATENT DOCUMENTS 2-3598  1/1990  Japan .

OTHER PUBLICATIONS

Honda Owner's Manual for CBR1000F, 1991.

Primary Examiner—Ed L. Swinehart
Attorney, Agent, or Firm—Knobbe, Martens, Olson & Bear, LLP

[57] ABSTRACT

A personal watercraft includes a component arrangement which reduces heat exposure to many critical, heat-sensitive components of the watercraft. The personal watercraft includes a calalyzer within an exhaust system to treat engine exhaust before discharge. The catalyzer operates at a high temperature. Heat-sensitive components of the engine, such as, for example, fuel and coolant supply lines and electrical and mechanical cables, are positioned on a side of a longitudinal center line of the watercraft opposite of the catalyzer. This arrangement reduces the degree of heat exposure experienced by these engine components to improve their function and durability.

25 Claims, 5 Drawing Sheets

WATERCRAFT COMPONENT LAYOUT

BACKGROUND OF THE INVENTION

1. Field of the Invention

The present invention relates to a small watercraft, and in particular to the arrangement of heat-sensitive components in the watercraft.

2. Description of Related Art

Personal watercraft have become popular in recent years. This type of watercraft is quite sporting in nature and is designed to carry a rider and possibly one or two passengers. A relatively small hull of the personal watercraft commonly defines a rider's area above an engine compartment.

An internal combustion engine frequently powers a jet propulsion unit which propels the watercraft. The engine lies within the engine compartment in front of a tunnel formed on the underside of the watercraft hull. The jet propulsion unit is located within the tunnel and is driven by a drive shaft. The drive shaft commonly extends between the engine and the jet propulsion device, through a wall of the hull that forms a front gullet portion of the tunnel.

Personal watercraft often employ an in-line, multi-cylinder, crankcase compression, two-cycle engine, usually including two or three cylinders. The engine conventionally lies within the engine compartment with the in-line cylinders aligned along a longitudinal axis of watercraft hull (in the bow-stern direction).

An exhaust system of the personal watercraft discharges engine exhaust to the atmosphere either through or close to the body of water in which the watercraft is operated. Although submerged discharge of engine exhaust silences exhaust noise, environmental concerns arise. These concerns are particularly acute in two-cycle engines because engine exhaust from two-cycle engines often contains lubricants and other hydrocarbons.

Such environmental concerns have raised a desire to minimize exhaustion of hydrocarbons and other exhaust byproducts (e.g., carbon monoxide and oxides of nitrogen) and thus reduce pollution of the atmosphere and the body of water in which the watercraft is operated. In response to increased concerns regarding exhaust emission, some personal watercraft have become equipped with a catalyzer to convert exhaust byproducts to harmless gases.

Catalyzers must operate at a relatively high temperature in order for the necessary thermal reaction and burning of the exhaust byproducts to occur. A catalyzer thus desirably operates within a specific range of temperature so as to effectively and efficiently convert engine exhaust into generally harmless gases. The catalyzer thus often lies near the engine in order to operate at elevated temperatures.

SUMMARY OF THE INVENTION

The present invention includes the recognition that many components of a small watercraft, which are located in the engine compartment, are adversely affected by the high operating temperature of the catalyzer. This effect is exacerbated in a personal watercraft where the small engine compartment usually is not overly ventilated. A need therefore exists for an improved component arrangement for a personal watercraft in which heat-sensitive components within the engine compartment of the watercraft are generally isolated from the heat effects of an exhaust system catalyzer.

One aspect of the present invention thus involves a personal watercraft including a hull which defines a control mast located in front of a rider's area. The rider's area is sized to accommodate at least one rider. The hull also has a longitudinal center line and defines an engine compartment. An internal combustion engine is disposed within the compartment. The engine includes at least one exhaust port and an output shaft which drives a propulsion device attached to the watercraft hull. At least one operational cable extends from the control mast to either the engine or the propulsion device on one side of the longitudinal center line. Electrical cables extend between a source of electricity and electrical components of the engine. The electrical cables are located on the same side of the longitudinal center line as the operational cable. An exhaust system of the watercraft communicates with the exhaust port of the engine and delivers exhaust gases to a discharge end for expulsion from the watercraft. The exhaust system includes a catalyzer which is disposed on a side of the longitudinal center line opposite of the electrical and operational cables.

In accordance with another aspect of the present invention, a personal watercraft includes a hull that defines a rider's area of a size to accommodate at least one rider. The hull has a longitudinal center line and defines an engine compartment containing an internal combustion engine. The engine includes a starter motor powered by a battery, at least one exhaust port and an output shaft. The output shaft drives a propulsion device attached to the watercraft hull. The starter motor and the battery are disposed to a side of the longitudinal center line. An exhaust system of the watercraft communicates with the exhaust port of the engine and delivers exhaust gases to a discharge end for expulsion from the watercraft. The exhaust system includes a catalyzer disposed on a side of the longitudinal center line opposite of the starter motor and the battery. This arrangement of the battery, starter motor and catalyzer within the watercraft hull enhances the balance of weight on either side of the longitudinal center line of the watercraft.

An additional feature of the invention involves a personal watercraft having a hull which defines a rider's area that is sized to accommodate at least one rider. The hull has a longitudinal center line and defines an engine compartment containing an internal combustion engine. The engine includes at least one exhaust port and an output shaft. The output shaft drives a propulsion device attached to the watercraft hull. A coolant supply line supplies coolant to the engine and extends beside the longitudinal center line over a majority of the coolant supply line's length on one side of the longitudinal center line. An exhaust system communicates with the exhaust port of the engine and delivers exhaust gases to a discharge end for expulsion from the watercraft. The exhaust system includes a catalyzer disposed on a side of the longitudinal center line opposite of the side on which the majority length of the coolant supply line extends.

In accordance with another feature of the present invention, a personal watercraft includes a hull defining a rider's area which is sized to accommodate at least one rider. The hull has a longitudinal center line and defines an engine compartment containing an internal combustion engine. The engine includes at least one exhaust port and an output shaft which drives a propulsion device attached to the watercraft hull. An exhaust system communicates with the exhaust port of the engine and delivers exhaust gases to a discharge end for expulsion from the watercraft. The exhaust system includes a catalyzer disposed on one side of the longitudinal center line. A fuel tank is located within the watercraft hull with a fuel supply line extending between the fuel tank and the engine. At least a portion of the fuel supply line, which lies near the catalyzer, is located on a side of the longitudinal center line opposite of the catalyzer.

BRIEF DESCRIPTION OF THE DRAWINGS

These and other features of the invention will now be described with reference to the drawings of preferred embodiments which are intended to illustrate and not to limit the invention, and in which.

DETAILED DESCRIPTION OF PREFERRED EMBODIMENT OF THE INVENTION

Figure 1:
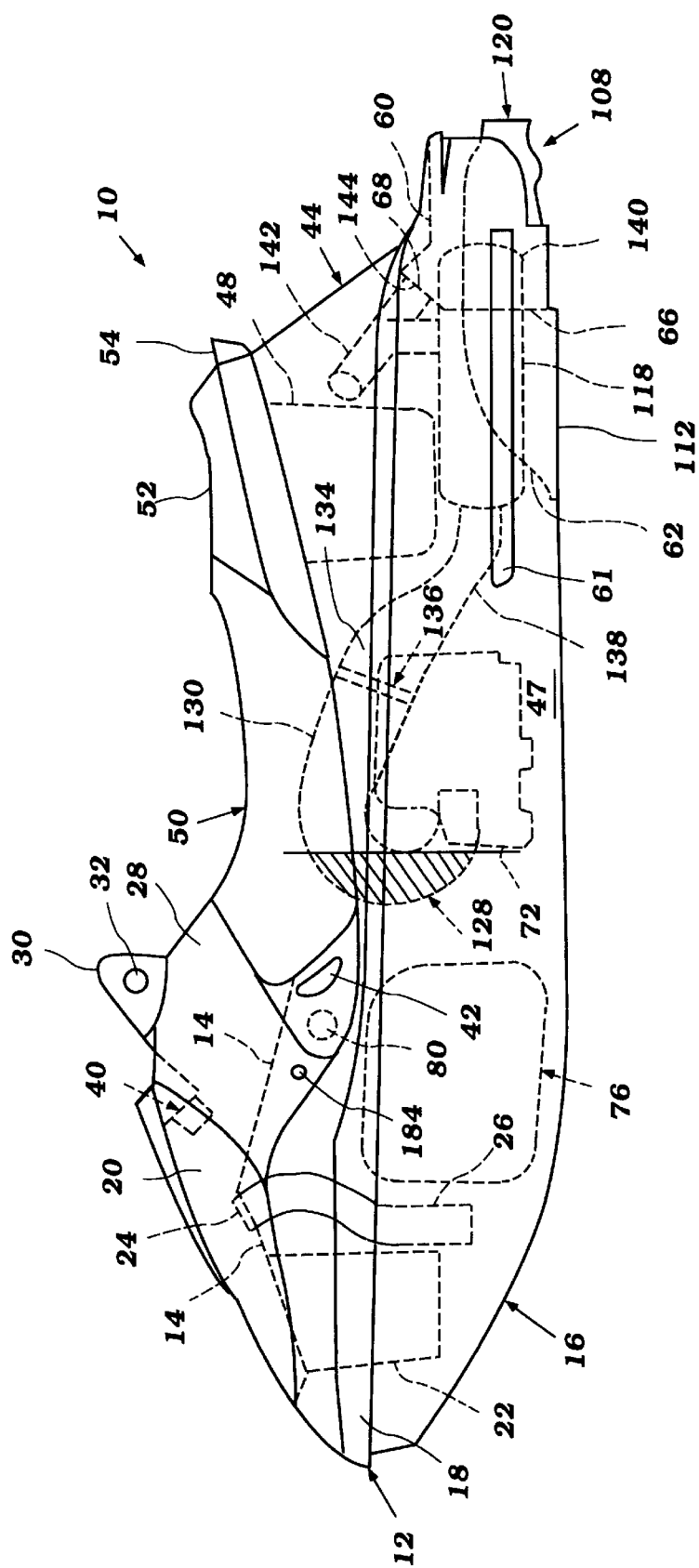
FIG. 1 is a side elevational view of a personal watercraft configured in accordance with a preferred embodiment of the present invention.
Figure 2:
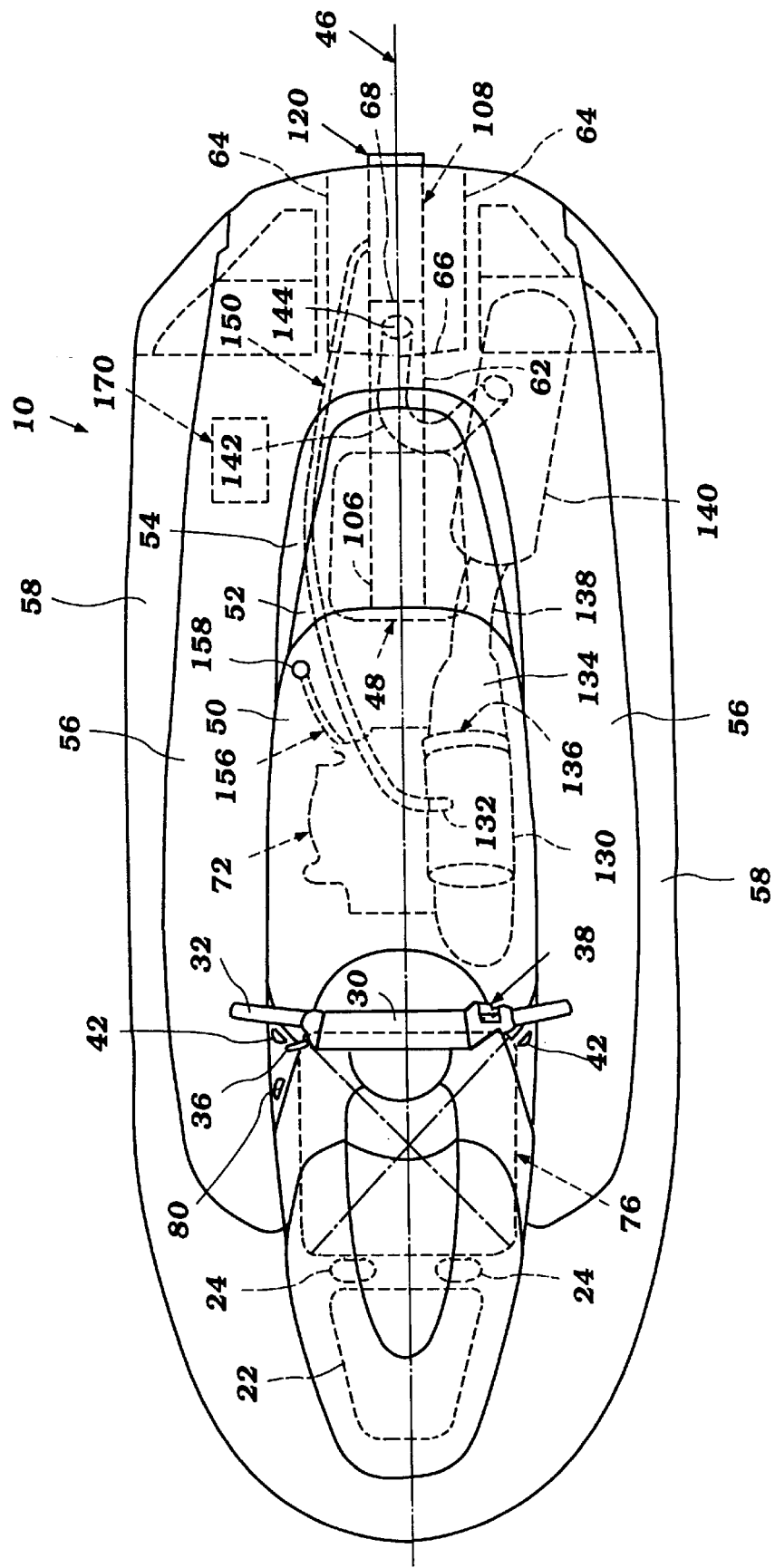
FIG. 2 is a top plan view of the personal watercraft of FIG. 1.

FIGS. 1 and 2 illustrate a personal watercraft 10 which is configured in accordance with a preferred embodiment of the present invention. The watercraft 10 includes a hull 12 formed by an upper deck section 14 and a lower hull section 16. The hull sections 14, 16 are formed from a suitable material such as, for example, a molded fiberglass reinforced resin. The lower hull section 16 and the upper deck section 14 are fixed to each other around the peripheral edges 18 in any suitable manner.

The front of the deck section 14 includes a hatch cover 20. The hatch cover 20 encloses a front storage container 22 within the hull 12 on the bow of the watercraft 10.

A pair of air inlets 24 are formed in the upper deck section 14 to provide an air flow into a front end of the hull 12. In the illustrated embodiment, the air inlets 24 lie beneath the hatch cover 20 just behind the front storage container 22. The air inlets 24 communicate with a pair of ventilation ducts 26 which extend into the lower hull section 16, as seen in FIG. 1.

Figure 5:
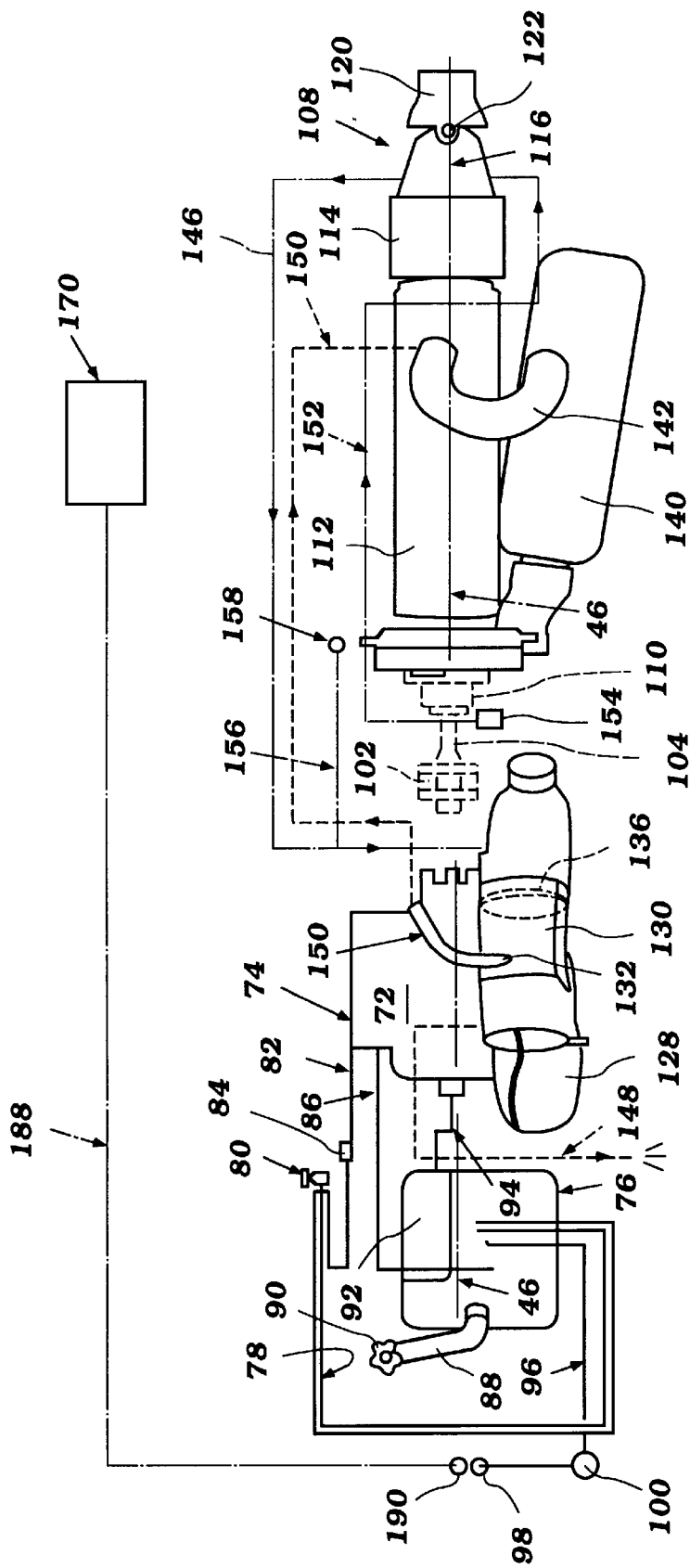
FIG. 5 is a schematic illustration of an arrangement of watercraft components within a hull of the watercraft in accordance with an embodiment of the present invention.

A raised control area 28 extends upward from the deck section 14 behind the hatch cover 20. The control area 28 includes a control mast 30 with a steering handle 32 for steering the watercraft 10 in a known manner. The control mast 30 or the steering handle 32 also can carry other watercraft controls, such as, for example throttle and starter controls. In the illustrated embodiment, as best seen in FIGS. 2 and 5, one side of the steering handle 32 includes a throttle lever 34 and a reverse lever 36, and the other side includes a control box 38. The control box 38 desirably includes a start button and a engine-kill switch.

An instrument control panel 40 lies in front of the control mast 30. In the illustrated embodiment, the instrument panel is formed in the control area 28 and includes a speedometer, a fuel gauge and an oil gauge.

A second pair of air inlets 42 are formed in the upper deck 14 on opposite sides of the control mast 30. The air inlets 42 open into the hull 12 to supply fresh air.

The rear portion of the hull deck portion 14 defines a rider's area. The rider's area includes a longitudinally extending raised pedestal 44 which extends from the raised control area 28 toward the aft end of the watercraft 10. In the illustrated embodiment, the pedestal 44 is located along a longitudinal center line 46 (see FIG. 2) of the watercraft hull 12. The pedestal 44 includes a front opening that opens into an engine compartment 47 within the hull 12. The pedestal 44 also includes a rear opening in which a rear container 48 is disposed.

The pedestal 44 supports a front seat cushion 50 and a rear seat cushion 52. The front seat cushion 50 is sized to cover the front opening and to surround the upper end of the raised pedestal 44. The rear seat cushion 52 is sized to cover the opening to the rear container 48 and to surround the upper rear end of the raised pedestal 44. The front and rear seat cushions 50, 52 desirably are removably attached to pedestal 44. The rear seat cushion 52 can cover the latching mechanism, which secures the front seat cushion 50 to the pedestal 44, to require the removal of the rear cushion 52 before gaining access to the front opening into the engine compartment 47.

A grip 54 desirably extends around the rear end of the raised pedestal 44, about the lower end of the rear seat cushion 52. The grip 54 includes a plurality of holes in which riders can place their hands to hold onto the grip 54.

As best seen in FIG. 2, foot areas 56 are formed on the sides of the pedestal 44 between gunnels 58 on the watercraft hull 12 and the pedestal 44. Riders can place their feet in the foot areas 56 when straddling the seat pedestal 44. The outer sides of the foot areas 56 are bounded by the raised gunnels 58 which help protect the riders' legs. A rear part of each foot area 56 opens into a boarding platform 60 that is used by the riders to board the watercraft 10 from the water in which the watercraft 10 is operated.

As best understood from FIG. 1, the lower hull section 16 generally has a V-shape formed by a pair of inclined sections which extend outwardly from a keel line to outer chines. Each outer chine is formed at the intersection between one of the incline sections and a sidewall of the lower hull. The incline sections are inclined at a desired dead rise angle.

The watercraft 10 desirably includes a pair of sponsons 61 arranged on the side walls of the lower hull section 16. The sponsons 61 have elongated lengths and can be adjustable on the side walls to alter the handling characteristics of the watercraft 10.

Figure 3:
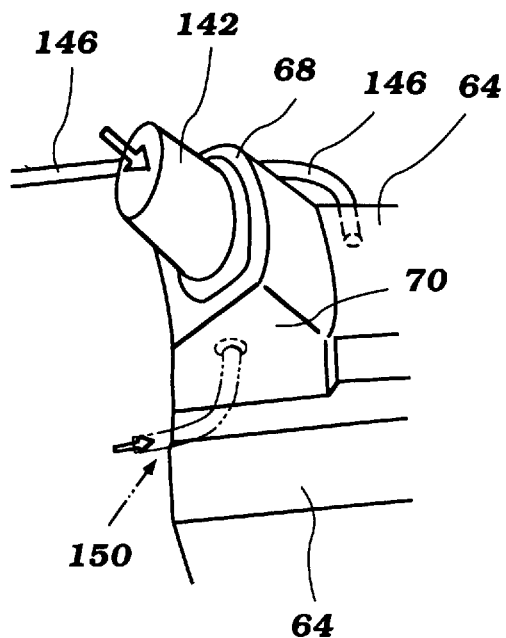
FIG. 3 is a partial top perspective view of a channel of a watercraft hull illustrating the arrangement of outlet ends of an exhaust pipe and water discharge conduits.
Figure 4:
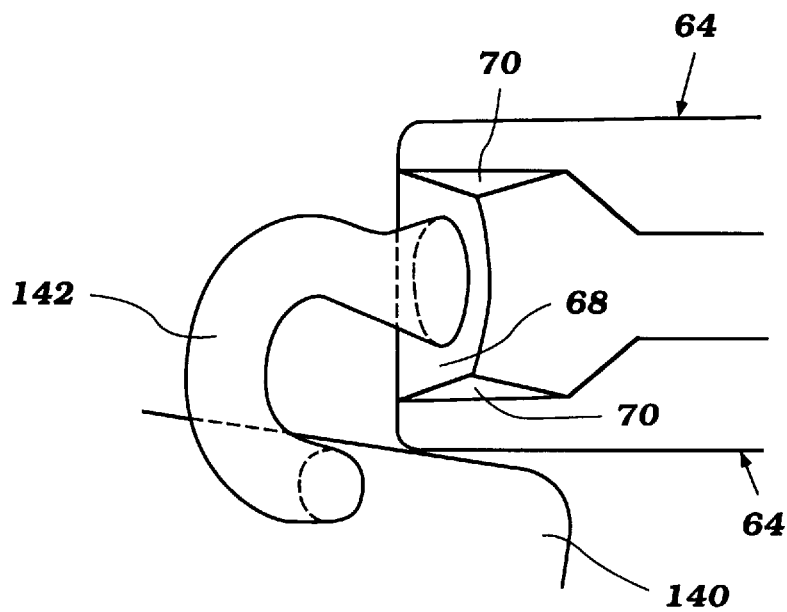
FIG. 4 is a partial top plan view of the channel and exhaust pipe of FIG. 3.

Toward the aft end of the lower hull section 16, the inclined sections extend outwardly from a central recess section which forms a portion of a tunnel 62. The tunnel 62 opens to the rear into a larger channel 64 located at the aft end of the lower hull section 16. The rear end of the tunnel 62 extends through a generally vertical wall 66 of the hull lower section 16 that forms the front end of the channel 64. An upper end 68 of the channel front wall 66 is skewed. And, as seen in FIGS. 3 and 4, side wall segments 70 complete the upper end of the channel 64 near its skewed upper wall 68.

With reference to FIGS. 1, 2 and 5, the lower hull portion 16 and the upper deck portion 14 form the engine compartment 47 located at least in part below the raised pedestal 44. The engine compartment 47 terminates at its rear end in a bulkhead (not shown). The front opening in the pedestal desirably opens into the engine compartment 47.

An engine 72 is contained within the engine compartment 47 and is mounted primarily beneath the forward portion of the pedestal 44. Engine mounts secure the engine 72 to the hull lower portion 16 in a known manner.

The engine 72 desirably is a multi-cylinder internal combustion engine. In the illustrated embodiment, the engine 72 includes two in-line cylinders and operates on a two-stroke, crankcase compression principle. The engine 72 is positioned such that the row of cylinders lies parallel to the longitudinal center line 46 of the watercraft hull 14, running from bow to stem. This engine type, however, is merely exemplary. Those skilled in the art will readily appreciate that the present watercraft component layout can be used with any of a variety of engine types having other number of cylinders, having other cylinder arrangements and operating on other combustion principles (e.g., four-stroke principle). The engine, regardless of its type, desirably is centrally located relative to the longitudinal center line of the watercraft.

A cylinder block and a cylinder head assembly desirably form the cylinders of the engine 72. Pistons reciprocate within the engine 72 and drive an output shaft, such as a crankshaft, in a known manner. The crankcase desirably is journaled with a crankcase, which in the illustrated embodiment is located beneath the cylinder block.

The crankshaft chambers of the engine 72 are sealed from one another with each crankcase chamber communicating with a dedicated combustion chamber. The combustion chamber is defined between the corresponding cylinder bore, piston and cylinder head. Because the internal details of the engine 72 desirably are conventional, a further description of the engine construction is not believed necessary to understand and practice the invention.

As schematically illustrated in FIG. 5, a conventional induction system 74 supplies an fuel/air charge to a plurality of crankcase chambers formed within the crankcase of the engine 72. The induction system 74 includes at least one charge former that receives fuel from a fuel tank 76. In the illustrated embodiment, the induction system desirably includes a plurality of floatless-type carburetors which form a fuel charge for each of the crankcase chambers.

A fuel supply system supplies the fuel from the fuel tank 76 to the charge formers of the induction system 74. A fuel supply hose 78 leads from the fuel tank 76 to a fuel shut-off valve or fuel cock 80. In the illustrated embodiment, as illustrated in FIGS. 1 and 2, the fuel cock 80 desirably is mounted onto the side of the watercraft 10 near to the steering mast 30. In this position, the operator of the watercraft 10 can easily access the fuel cock 80 to shut off fuel flow to the engine 72.

Figure 6:
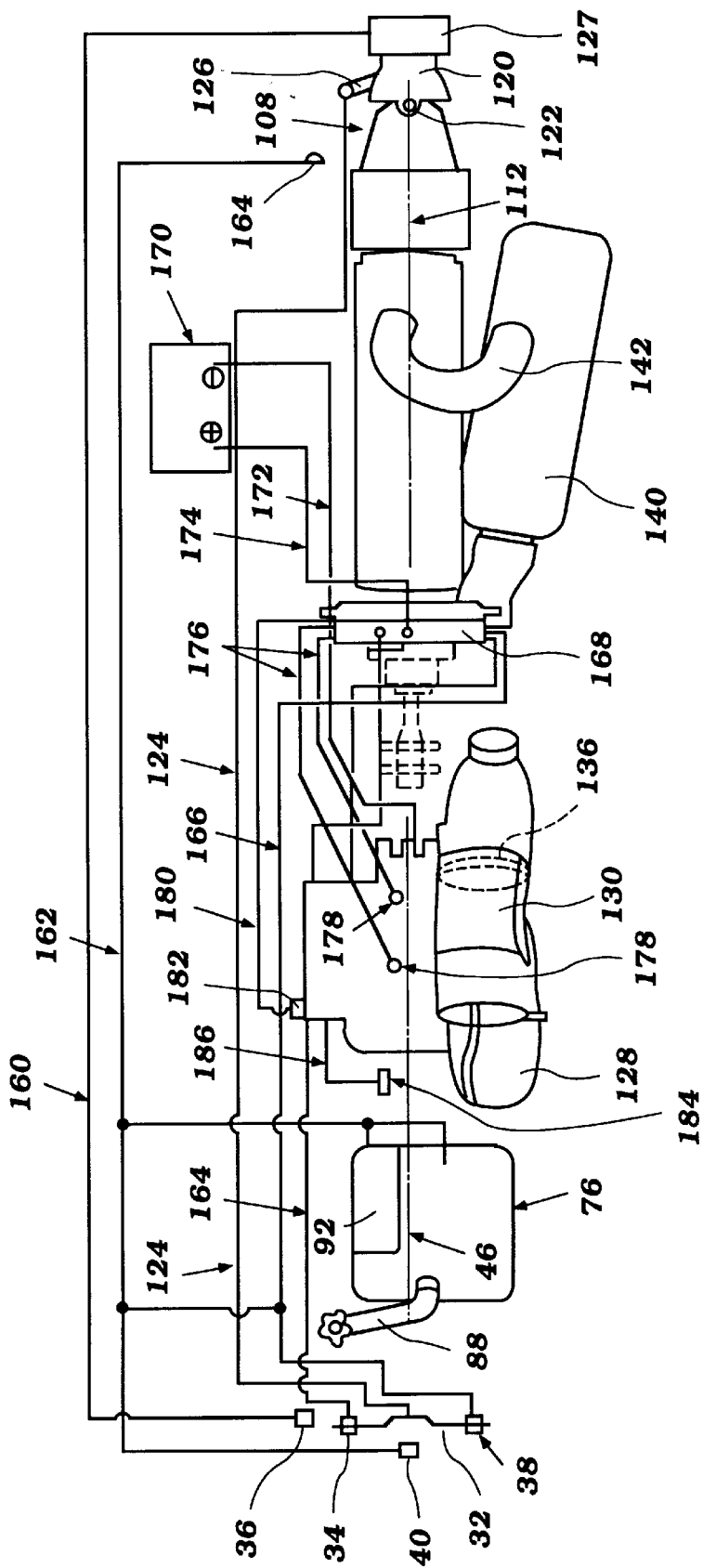
FIG. 6 is a schematic illustration of an arrangement of watercraft component in a hull of the watercraft in accordance with another embodiment of the present invention.

A fuel line 82 leads from the fuel cock 80 to a fuel filter 84 before delivering the fuel to the charge formers of the induction system 74. As seen in FIG. 6, a fuel return line 86 extends between the charge formers and the fuel tank 76 to return excess fuel to the fuel tank 76.

In the illustrated embodiment, the fuel tank 76 is located within the watercraft hull 12 in front of the engine 72. A stand pipe 88 desirably leads from an fuel input to the fuel tank 76. The fuel input is located on the surface of the upper deck portion 16 and is sealed by a removable fuel cap 90.

The fuel tank 76 may also include a separate lubricant tank 92 which is integrated into the structure of the fuel tank 76. The lubricant tank 92 includes an inlet (not shown) through which lubricant is supplied to the lubricant tank 92. A lubricant supply line 94 leads from the tank 92 and delivers lubricant to an oil pump. The oil pump in turn delivers the lubricant to the engine 72 in a known manner.

The gas tank also can includes a breather pipe 96. The breather pipe 96 extends from an opening 98 located on the front end of the watercraft bow into the tank 76. A fuel vapor canister 100 desirably is located within the breather pipe 96 to prevent fuel vapor from escaping to the atmosphere from the fuel tank 76.

The engine 72 drives a propulsion device to propel the watercraft 10. As seen in FIG. 5, a flexible coupling 102 interconnects an engine output shaft to an impeller shaft 104. If the engine output shaft is vertically disposed, the impeller shaft 104 also can be driven through a bevel gear transmission or a similar transmission.

The propeller shaft 104 extends rearwardly through the bulkhead (not shown) and a protective sleeve 106 (see FIG. 2), to a jet propulsion unit 108 and drives an impeller of the unit 108. A bearing assembly 110, which is secured to the bulkhead, supports the impeller shaft 104 behind the shaft coupling 102.

The jet propulsion unit 108 primarily is positioned within the channel 64 in the rear center of the lower hull section 16 located behind the bulkhead. The propulsion unit 108 includes a inlet 112 having an inlet opening formed on the bottom side of the lower hull section 16. The gullet 112 lies in the tunnel 62 of the lower hull section 16 in front of the channel 64 and extends from the inlet opening to a pressurization chamber 114 (FIG. 5) which is mounted in the channel 64. The pressurization chamber 114 in turn communicates with a nozzle section 116 of the propulsion unit 108. A ride plate 118 covers a portion of the tunnel 62 behind the gullet inlet 112 to enclose the pump chamber 114 and the nozzle 116 within the channel 64. In this manner, the lower opening of the channel 64 is closed.

The impeller is located toward the front end of the chamber 112. The rotating impeller, which the impeller shaft 104 drives, pressurizes the water within the chamber 112 and forces the pressurized water through the nozzle section 116 of the propulsion unit 108. A steering nozzle 120 directs the exit direction of the water stream exiting the jet propulsion unit 108. The steering nozzle 120 is pivotally supported by a pivot shaft 122 at the rear of the jet propulsion unit 108 to change the thrust angle on the watercraft 10 for steering purposes as is known in the art.

As seen in FIG. 6, the steering nozzle 120 is connected to the steering handle 32 by a steering cable 124 connected to a lever 126. The steering cable 124 translates movement of the steering handle 32 to move the steering nozzle 120 in a corresponding direction and to a corresponding degree.

A reverse bucket 127 cooperates with the steering nozzle 120 to reverse the thrust of the jet propulsion device 108. The operation of the reverse bucket 127 is described below.

As best understood in reference to FIGS. 1 through 4, an exhaust system is provided to discharge exhaust byproducts from the engine 72 to the atmosphere and/or to the body of water in which the watercraft 10 is operated. The exhaust system includes a C-shaped pipe section 128. In the illustrated embodiment, the C-pipe 128 is located to the rear of the fuel tank 76.

This C-pipe 128 includes an inner tube that communicates directly with the discharge end of an exhaust manifold of the engine. An outer tube surrounds the inner tube to form a coolant jacket between the inner and outer tubes. Although not illustrated, the C-pipe includes an inlet port positioned near its inlet end. The inlet port communicates with the water jacket of the C-pipe.

The outlet end of the C-pipe 128 communicates with an expansion chamber 130. In the illustrated embodiment, the expansion chamber 130 has a tubular shape in which an expansion volume is defined within an annular, thick wall. Coolant jacket passages extend through the expansion chamber wall and communicate with the coolant jacket of the C-pipe 128.

A flexible coupling connects the outlet end of the C-pipe 128 to the inlet end of the expansion chamber 130. The expansion chamber 130 also includes an outlet port 132 which communicates with an internal coolant passage within the expansion chamber 130.

The outlet end of the expansion chamber 130 is connected to reducer pipe 134 which tapers in diameter toward its outlet. The pipe 134 has a dual shell construction formed by an inner shell which defines an exhaust flow passage. The expansion volume communicates with this passage. An outer shell is connected to the inner shell and defines a cooling jacket about the inner shell. The coolant jacket passages of the expansion chamber 130 communicate with the coolant jacket of the pipe 134 to discharge a portion of the coolant with the exhaust gases.

A catalyzer 136 is interposed between the ends of the expansion chamber 130 and the reducer pipe 134. In an exemplary embodiment, the catalyzer includes an annular shell supporting a honeycomb-type catalyst bed. The catalyst bed is formed of a suitable catalytic material such as that designed to treat and render harmless hydrocarbons, carbon monoxide, and oxides of nitrogen. An annular flange supports the annular shell generally at the center of the flow path between the expansion chamber 130 and the reducer pipe 134. In this manner, all exhaust gases flowing through the expansion chamber 130 flow through the catalyzer 136.

In the illustrated embodiment, the annular flange of the catalyzer is held between the corresponding ends of the expansion chamber 130 and the reducer pipe 134. The annular flange includes a plurality of apertures which place the cooling jacket of the expansion chamber 130 in communication with the cooling jacket of the reducer pipe 134. In this manner, at least a portion of the water flowing through the water jacket of the expansion chamber 130 flow into the water jacket of the reducer pipe 134.

The lower section of the reducer pipe 134 includes a downwardly turned portion that terminates at the discharge end. The inner shell of the pipe 134 stops short of the outer shell such that the water flow through the water jacket merges with the exhaust gas flow through the exhaust passage at the discharge end.

A flexible pipe 138 is connected to the discharge end of the reducer pipe 134 and extends rearwardly along one side of the watercraft hull tunnel 62. The flexible conduit 138 connects to an inlet section of a water trap device 140. The water trap device 140 also lies within the watercraft hull 16 on the same side of the tunnel 62.

The water trap device 140 has a sufficient volume to retain water and to preclude the back flow of water to the expansion chamber 130 and the engine 72. Internal baffles within the water trap device 140 help control water flow through the exhaust system.

An exhaust pipe 142 extends from an outlet section of the water trap device 140 and wraps on top of the tunnel 64 to a discharge end 144. The discharge end 144 desirably opens into the channel 64 through the upper wall 68.

An engine and exhaust cooling system is provided for cooling the engine 72 and the exhaust system. The cooling system is formed in part by the coolant passages and jackets described above in connection with the exhaust system.

The cooling system supplies fresh cooling water to an inlet port of the exhaust manifold of the engine 72. In the illustrated embodiment of FIG. 5, the propulsion unit 108 supplies cooling water through a conduit 146 to an exhaust manifold cooling jacket. The cooling water passing through the exhaust manifold coolant passages flows into the cooling passages within the engine 72. The cooling water for the passages near a first cylinder of the engine 72 is then discharged through the first discharge port (not shown), and the cooling water for the passages near a second cylinder of the engine 72 is discharged through the second discharge port on the cylinder head. A small amount of the cooling water passes through the second port and into a telltale line 148. As telltale water, the water is discharged from a plate on the port side of the watercraft 10 in a position visible to the rider.

The majority of the cooling water flows through the first port and into a conduit (not shown) which delivers the cooling water to water jackets surrounding the exhaust pipe sections. The conduit connects to the inlet port (not shown) of the C-pipe, located near the outlet end of the exhaust manifold. The cooling water flow through the water jacket of the C-pipe 128 and into the jacket of the expansion chamber 130.

A portion of the cooling water is discharged through the outlet port 132 because too much cooling water in the exhaust stream tends to cause flow resistance. A conduit 150 carries the cooling water that is discharged through the outlet port 132 to the outlet end 144 of the exhaust pipe 142.

The balance of the cooling water flows through the jackets within the expansion chamber 130 and the reducer pipe 134. The cooling water merges into the exhaust gas stream at the discharge end of the pipe 134, and flow into the flexible hose 138 toward the water trap 140. The cooling water is eventually discharged with the exhaust gases through the outlet end 144 of the exhaust pipe 142.

As seen in FIG. 5, the bilge outlet hose extends from a bilge device to a port formed on the discharge nozzle 120 of the propulsion system 108. The bilge water removal device may include a Venturi such that the water flow through the discharge nozzle 120 draws bilge water into the inlet device 154 and through the bilge water outlet hose 152. Alternatively, a bilge pump can be used in connection with the bilge water outlet hose 152 to discharge water from the bilge area within the hull 12.

The cooling system also can include a flush hose 156 which interconnects with the coolant supply line 146 to flush the cooling system. For this purpose, the flush hose includes a fitting 158 to cooperate with a conventional water hose.

With reference to FIG. 6, the steering nozzle control cable 124 extends from the steering mast 30 to the steering nozzle 120. The cable 124 transmits movement of the handle 32 on the steering mast 30 to rotate the nozzle 120 for steering purposes about the shaft 122. The control mast 30 also includes the reverse lever 36 which is connected to the reverse bucket 127 on the steering nozzle 120 by a reverse bucket control cable 160. The control cable 160 transmits movement of the reverse lever 36 to actuate the reverse bucket 127 in a known manner.

As seen in FIG. 1, the control display 40 is located in front of the steering handle 32 on the raised control area 28. The control panel 40 includes a speedometer as well as a fuel and oil gage as noted above. As schematically illustrated in FIG. 6, a wiring harness 162 includes a signal line which extends from a speed sensor 164 to the speedometer. As schematically illustrated in FIG. 6, the speed sensor 164 is located at the rear of the watercraft 10. The wiring harness 162 also includes signal lines which extend from level meters which are located within the fuel tank 76 and the oil tank 92. In this manner, the speedometer, fuel gage, and oil gage communicate with their respective sensors.

As noted above, the steering handle 32 also carries a throttle lever 34. A throttle cable 164 connects the throttle lever 34 to a throttling device, such as, for example, throttle valves, of the induction system 74. The throttle cable 164 communicates movement of the throttle lever 34 to the throttling device to actuate the throttle device in a known manner.

The steering handle 32 also desirably includes the control box 38. The control box 38 has a start button as well as a kill switch. An electrical cable 166 extends from the control box 38 to an electrical box 168 located behind the engine 72. Actuation of either the starter button or the kill switch triggers relays within the electrical box 168 as described below.

A battery 170 also communicates with the electrical box 168 to supply electricity to the electrical box 168. The negative terminal of the battery 170 is grounded to the engine 170 by a first battery cable 172. A second battery cable 174 connects the positive terminal of the battery 170 to the electrical box 168 to supply electricity to the box.

Spark plug cords 176 lead from the electrical box 168 to spark plugs 178 on the engine 72. A wiring harness 180 also leads from the electrical box 168 to a starter motor 182. When the start button is pushed on the control box 38, the relays in the electrical box 168 are actuated to supply electricity to the starter motor 182 to turn over the engine 72. In addition, the relays are actuated to supply electricity to an ignition control system which provides capacitance discharge at desired timing to the spark plugs 178, in a known manner.

The induction system 74 desirably includes a choke device such as, for example, at least one choke valve. In the illustrated embodiment, a choke lever 184 operates the choke valve through a choke cable 186. As seen in FIG. 1, the choke lever 184 is positioned on the side of the upper deck portion 14 near the control mast 30.

As seen in FIG. 5, a breather pipe 188 extends from the battery 170 toward an opening 190 on the front of the watercraft bow. The breather pipe 188 thus discharges from the engine compartment 47 undesirable gases emitted from the battery 170.

As FIGS. 5 and 6 schematically illustrate, various heat sensitive components of the engine 72 are located on a side of the longitudinal centerline 46 of the watercraft hull 12 which is opposite of the side on which the catalyst 136 of the exhaust system is located. In this manner, these heat sensitive components are generally isolated from the thermal effects produced by the elevated temperature associated with the catalyzer 136. As seen in FIG. 6, the various operational cables are located all on the same side of the longitudinal centerline 46 and on the side opposite the catalyzer 136. For instance, the steering nozzle control cable 124, the reverse bucket control cable 160, the throttle cable 164 and the choke cable 186 all extend through the engine compartment 47 from the steering mast 30 toward the engine 72 and the propulsion device 108 on the starboard side of the hull 12. The catalyzer 136 lies on the port side of the longitudinal centerline 46. Consequently, these cables experience less thermal expansion and contraction than previously experienced in prior watercraft component layouts.

Similarly, various electrical cables and wiring harnesses of the watercraft also lie on a side of a longitudinal centerline opposite of the side on which the catalyzer is disposed. In the illustrated embodiment, the signal line harness 162, spark plug cables 176, starter cable 180, and battery leads 172, 174 all lie on the starboard side of the longitudinal centerline 46 of the watercraft hull 12, while the catalyst 136 lies on the port side.

The cooling system and the fuel supply system also principally lie on a side of the longitudinal centerline 46 which is opposite of the side on which the catalyzer 136 is disposed. As schematically illustrated in FIG. 5, the portion of the fuel supply line 82 and the fuel return line 86 which are near the engine 72, as well as the fuel cock 80 lie on the starboard side of the longitudinal centerline 46. And that portion of the fuel supply line which lies on the same side of the longitudinal centerline as the catalyzer is arranged to extend well forward of the catalyzer in front of the fuel tank. Accordingly, the heat effects of the catalyzer on the fuel supply line are reduced. The fuel is less likely to vaporize as it is delivered to the charge formers of the engine. As a result, a more precise fuel air ratio of the charge delivered to the engine can be obtained.

The coolant supply system also principally lies on the starboard side of the longitudinal centerline. As seen in FIG. 5, the majority of the coolant supply hose length extends from the propulsion device 108 to the engine 72 on the starboard side of the longitudinal centerline 46. For this purpose, the inlet port of the coolant supply line formed on the discharge nozzle of the propulsion device is located on the starboard side in the illustrated embodiment. The coolant supply lines only crosses the longitudinal centerline and extends on the port side of the longitudinal centerline for a very short distance in order to connect to an inlet port formed on the exhaust manifold of the engine, as described above. As a result of positioning the coolant supply line away from the catalyzer and the balance of the exhaust system, the cooling water is less likely to absorb heat before introduction into the cooling system of the engine. Consequently, cooling efficiency of the engine can be increased.

The present layout of these heat sensitive components of the watercraft thus improves the performance of the watercraft engine and the control of the watercraft. In addition, these components are less likely to experience damage through deterioration caused by operation in a high temperature environment. Thermal fatigue of these components also is reduced. The durability and function of the components thus is improved with the present layout of the fuel system, coolant system and operational and electrical cables than with prior personal watercraft component layouts which include a catalyzer in the exhaust system.

In addition, the arrangement of the battery 170 and starter motor 182 on a side of the center line 46 opposite of the catalyzer provide good weight balance on either side of the center line 46. The stability of the watercraft thus also benefits from the present component layout.

Although this invention has been described in terms of a certain preferred embodiment, other embodiments apparent to those of ordinary skill in the art are also within the scope of this invention. Accordingly, the scope of the invention is intended to be defined only by the claims that follow.

What is claimed is:

1. A personal watercraft having a hull defining a control mast located in front of a rider's area which is sized to accommodate at least one rider, said hull having a longitudinal center line and defining an engine compartment containing an internal combustion engine which has at least one exhaust port and an output shaft, the output shaft driving a propulsion device attached to the watercraft hull, at least one operational cable extending from the control mast to either the engine or the propulsion device on one side of the longitudinal center line, electrical cables which extend between a source of electricity and electrical components of the engine, the cables being located on the same side of the longitudinal center line as the operational cable, an exhaust system communicating with the exhaust port of the engine and delivering exhaust gases to a discharge end for expulsion from the watercraft, the exhaust system including a catalyzer disposed on a side of the longitudinal center line opposite of the electrical and operational cables, and a cooling system including a cooling jacket juxtaposing at least a portion of the catalyzer and a discharge conduit being connected to the cooling jacket upstream of the catalyzer.

2. A personal watercraft as in claim 1, wherein the source of electricity comprises a battery which is disposed to a side of the longitudinal center line opposite of the side on which the catalyzer lies.

3. A personal watercraft as in claim 1, wherein one of said electrical components of the engine is a starter motor, and the starter motor is located on the side of the longitudinal center line opposite of the side on which the catalyzer is disposed.

4. A personal watercraft as in claim 1, wherein a fuel supply line extends between a fuel tank and the engine, the fuel supply line being located on a side of the longitudinal center line opposite of the side on which the catalyzer is disposed.

5. A personal watercraft as in claim 4, wherein a fuel cock is disposed within the fuel supply line, the fuel cock being mounted on a side of the hull near the control mast.

6. A personal watercraft as in claim 1, wherein a coolant supply line extends from the propulsion device to the engine to supplies coolant to the engine, the coolant supply line running beside the longitudinal center line over the majority of the coolant supply line's length on a side which is opposite of the side on which the catalyzer is disposed.

7. A personal watercraft having a hull defining a rider's area which is sized to accommodate at least one rider, said hull having a longitudinal center line and defining an engine compartment containing an internal combustion engine, the engine including a starter motor powered by a battery, at least one exhaust port and an output shaft, the output shaft driving a propulsion device attached to the watercraft hull, the starter motor and the battery being disposed to one side of the longitudinal center line, an exhaust system communicating with the exhaust port of the engine and delivering exhaust gases to a discharge end for expulsion from the watercraft, the exhaust system including a catalyzer disposed on a side of the longitudinal center line opposite of the side on which the starter motor and the battery are disposed and a cooling system including a cooling jacket juxtaposing at least a portion of the catalyzer and a discharge conduit being connected to the cooling jacket upstream of the catalyzer.

8. A personal watercraft as in claim 7 additionally comprising a plurality of electrical cables which connect the battery to a plurality of electrical components of the engine, including the starter, the electrical cables being located on the same side of the longitudinal center line as the battery.

9. A personal watercraft as in claim 7 additionally comprising a fuel supply line which extends between a fuel tank and the engine, and the supply tank being located forward of the engine.

10. A personal watercraft as in claim 9, wherein at least a portion of the fuel supply line which lies near the catalyzer is positioned on a side of the longitudinal center line opposite of the side on which the catalyzer is disposed.

11. A personal watercraft as in claim 10, wherein the fuel supply line includes a fuel cock which is mounted on a side of the hull in the vicinity of a front end of the rider's area.

12. A personal watercraft having a hull defining a rider's area which is sized to accommodate at least one rider, said hull having a longitudinal center line and defining an engine compartment containing an internal combustion engine which has at least one exhaust port and an output shaft the output shaft driving a propulsion device attached to the watercraft hull, a coolant supply line supplying coolant to the engine and extending beside the longitudinal center line over a majority of the coolant supply line's length on one side of the longitudinal center line, an exhaust system communicating with the exhaust port of the engine and delivering exhaust gases to a discharge end for expulsion from the watercraft, the exhaust system including a catalyzer disposed on a side of the longitudinal center line opposite of the side on which the majority length of the coolant supply line extends, and a cooling system including a cooling jacket juxtaposing at least a portion of the catalyzer and a discharge conduit being connected to the cooling jacket upstream of the catalyzer.

13. A personal watercraft as in claim 12, wherein the coolant supply line extends from the propulsion device to the engine.

14. A personal watercraft as in claim 12, wherein a fuel supply line extends between a fuel tank and the engine, the fuel supply line being located on a side of the longitudinal center line opposite of the side on which the catalyzer is disposed.

15. A personal watercraft as in claim 14, wherein a fuel cock is disposed within the fuel supply line, the fuel cock being mounted on a side of the hull near a front end of the rider's area.

16. A personal watercraft having a hull defining a rider's area which is sized to accommodate at least one rider, said hull having a longitudinal center line and defining an engine compartment containing an internal combustion engine which has at least one exhaust port and an output shaft, the output shaft driving a propulsion device attached to the watercraft hull, an exhaust system communicating with the exhaust port of the engine and delivering exhaust gases to a discharge end for expulsion from the watercraft, the exhaust system including a catalyzer disposed on one side of the longitudinal center line, a fuel tank located within the watercraft hull, a fuel supply line extending between the fuel tank and the engine, at least a portion of the fuel supply line which lies near the catalyzer being located on a side of the longitudinal center line opposite of the catalyzer, and a cooling system including a cooling jacket juxtaposing at least a portion of the catalyzer and a discharge conduit being connected to the cooling jacket upstream of the catalyzer.

17. A personal watercraft as in claim 16, wherein the fuel supply line includes a fuel cock which is mounted on a side of the hull in the vicinity of a front end of the rider's area.

18. A personal watercraft as in claim 16, wherein the exhaust system includes a C-shape pipe which is arranged to direct exhaust gases from a front end of the engine toward an aft end of the watercraft hull, and the catalyzer is located downstream of the C-shape pipe in the exhaust system.

19. A personal watercraft as in claim 18, wherein the fuel tank is disposed in front of the C-shaped pipe.

20. A personal watercraft as in claim 16, wherein a coolant supply line extends from the propulsion device to the engine to supply coolant water to the engine, a majority of the coolant supply line's length running beside the longitudinal center line on a side which is opposite of the side on which the catalyzer is disposed.

21. A personal watercraft having a hull defining a rider's area which is sized to accommodate at least one rider, the hull having a longitudinal center line and defining an engine compartment containing an internal combustion engine and at least one air inlet port opening from outside of the hull into the engine compartment, the engine including a starter motor powered by a battery, at least one exhaust port, an air induction system, the induction system conducting air from the engine compartment to the engine, and an output shaft, the output shaft driving a propulsion device attached to the watercraft hull, and an exhaust system communicating with the exhaust port of the engine and delivering exhaust gases to a discharge end for expulsion from the watercraft, the exhaust system including a catalyzer disposed on a side of the longitudinal center line, the starter motor and the battery being disposed on a side of the longitudinal center line opposite of the side on which the catalyzer is disposed and out of a direct line of air flow downstream of the catalyzer.

22. A personal watercraft as in claim 21 additionally comprising a plurality of electrical cables which connected the battery to a plurality of electrical components of the engine, including the starter, the electrical cables being located on the same side of the longitudinal center line as the battery and out of the direct line of air flow downstream of the catalyst.

23. A personal watercraft as in claim 21 additionally comprising a fuel supply line which extends between a fuel tank and the engine, wherein at least a portion of the fuel supply line which lies near the catalyzer is positioned on a side of the longitudinal center line opposite of the side on which the catalyzer is disposed and out of the direct line of air flow downstream of the catalyzer.

24. A personal watercraft as in claim 23, wherein the fuel supply line includes a fuel cock which is mounted on a side of the hull in the vicinity of a front end of the rider's area.

25. A personal watercraft as in claim 21, wherein a coolant supply line extends from the propulsion device to the engine to supply coolant to the engine, the coolant supply line running beside the longitudinal center line over the majority of the coolant supply line's length on a side which is opposite of the side on which the catalyzer is disposed and the coolant supply line so positioned as to be out of the direct line of air flow downstream of the catalyzer.

* * * * *